United States Patent [19]

Satou et al.

[11] Patent Number: 4,928,897

[45] Date of Patent: May 29, 1990

[54] FEEDER FOR FEEDING PHOTOSENSITIVE MATERIAL

[75] Inventors: Hiroyuki Satou; Norio Ookawa, both of Kanagawa, Japan

[73] Assignee: Fuji Photo Film Co., Ltd., Kanagawa, Japan

[21] Appl. No.: 298,600

[22] Filed: Jan. 18, 1989

[30] Foreign Application Priority Data

| Jan. 18, 1988 | [JP] | Japan | 63-4351[U] |
| Jan. 18, 1988 | [JP] | Japan | 63-4353[U] |
| Jan. 18, 1988 | [JP] | Japan | 63-4354[U] |
| Jan. 18, 1988 | [JP] | Japan | 63-4355[U] |
| Feb. 9, 1988 | [JP] | Japan | 63-28491 |

[51] Int. Cl.$^5$ .......................................... B65H 16/00
[52] U.S. Cl. ............................ 242/55; 355/72; 226/90
[58] Field of Search ............... 242/55, 55.53, 67.1 R, 242/198; 226/90; 355/72, 73, 74

[56] References Cited

U.S. PATENT DOCUMENTS

| 3,480,222 | 11/1969 | Goodman et al. | 242/55.53 X |
| 3,722,999 | 3/1973 | Cunha et al. | 355/72 X |
| 4,298,276 | 11/1981 | Tsuda et al. | 226/90 X |
| 4,566,785 | 1/1986 | Takenouchi | 355/72 |
| 4,699,034 | 10/1987 | Sue | 242/55 X |

Primary Examiner—John M. Jillions
Attorney, Agent, or Firm—Sughrue, Mion, Zinn, Macpeak & Seas

[57] ABSTRACT

A magazine body accommodating a photosensitive material is loaded into a processor of a photo-printing device. The magazine body incorporates a pair of rollers for seizing a mid-portion of the photosensitive material, the rollers being separated from each other when feeding the material to the processor. When loading the magazine into the processor, the material is completely stored inside the magazine body. After loading the magazine, input rollers mounted on a light shielding cover of the processor are rotated while being pressed. At this time, the pair of rollers approach each other to seize the photosensitive material. Subsequently, the rollers rotate to feed the material to the processor.

24 Claims, 12 Drawing Sheets

FEEDER FOR FEEDING PHOTOSENSITIVE MATERIAL

BACKGROUND OF THE INVENTION

1. Field of the Invention

The present invention is related to a feeder, that is incorporated into a photosensitive material processor of a printing device, for feeding a photosensitive material into the processor.

2. Description of the Prior Art

One typical arrangement of a printing device for printing an image from a negative film onto a printing paper is for a magazine that accommodates the rolled printing paper to be set in the printing device in such a way that the images are printed on the printing paper as it is sequentially pulled out of a magazine. The printed paper is then fed into a developing device.

In a printing device of the type that utilizes a magazine, the magazine must be dismounted therefrom when loading a new magazine thereinto or replacing it with another magazine of a different printing size, because the inside thereof has to be shielded from the light. However, after setting the magazine in the printing device the shutters of the magazine must be opened in order to pull out the printing paper accommodated therein and then feed printing paper to a printing unit.

Such being the case, prior art teaches that the printing paper is partially pulled out of the magazine before setting the magazine in the printing device. At the time of setting the magazine therein, the portion pulled out is inserted between seizing carrier rollers of the printing device. Printing paper is sequentially pulled from within the magazine as the seizing carrier rollers rotate. The portion previously pulled out of the magazine, having become fogged due to exposure, makes printing thereon impossible, resulting in a disadvantage of being uneconomical.

BRIEF SUMMARY OF THE INVENTION

It is a primary object of the present invention to provide a feeder for a photosensitive material in which there is no necessity for partially pulling out the photosensitive material when loading a magazine into a processor of a printing device.

To this end, according to one aspect to of the invention, there is provided a feeder for a photosensitive material, characterized in that: a magazine body accomodates the photosensitive material; a pair of rollers provided in the magazine are spaced apart from each other so as to admit passage of a mid-portion of the photosensitive material; input rollers partially exposed to an external portion of a light shielding cover are mounted on a photo-printing device; and a pressing force and a rotational force acting on the input rollers are imparted to the pair of rollers after closing the light shielding cover.

With this arrangement, when setting the magazine in the printing device, all of the photosensitive material can be accommodated in the magazine body. After setting the magazine therein, and closing the light shielding cover, pressing and rotational forces are applied to act on the input rollers. At this time, the pair of rollers approach to impart a driving force to the photosensitive material, whereby the top portion thereof is fed into the processor. During the printing process, the pair of rollers are separated from each other, hence the photosensitive material is drawn out smoothly. When the magazine body is removed the photosensitive material is led into the magazine by dint of reverse rotations.

BRIEF DESCRIPTION OF THE DRAWINGS

Still further objects and many of the attendant advantages of the invention will become more apparent during the following discussion in conjunction with the accompanying drawings, in which.

DETAILED DESCRIPTION OF THE PREFERRED EMBODIMENTS

Figure 1:
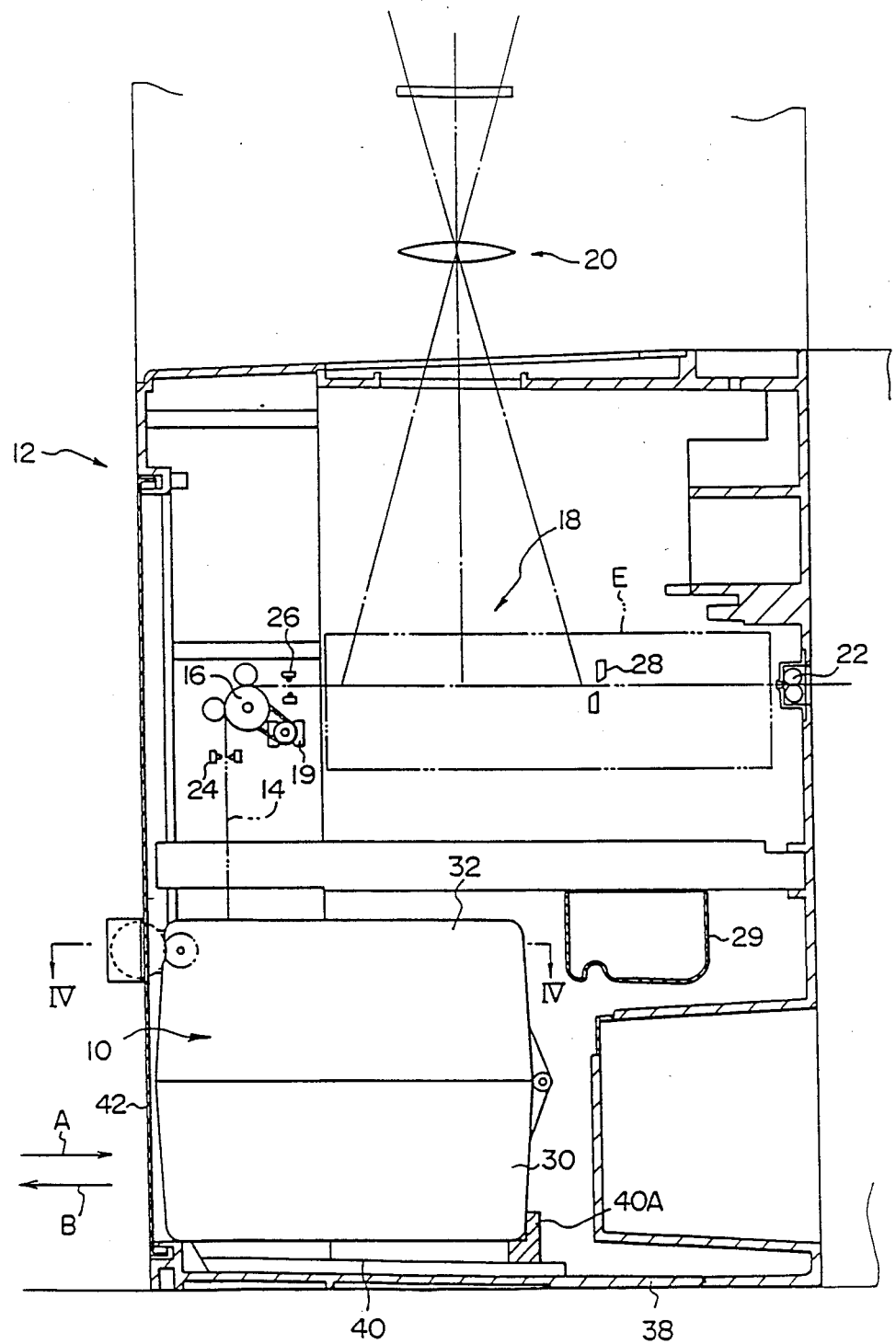
FIG. 1 is a vertical sectional view illustrating a printing device to which the present invention is applied.

FIG. 1 shows a printing device 12 to which the present invention is applied. Printing device 12 is arranged in the following manner: a sheet of printing paper 14 drawn upward out of a magazine 10 is fed in a horizontal direction by means of winding rollers. Subsequently, an image is printed on printing paper 14 by optical means 20 in an easel unit E of printing device 18. Printing paper 14 is then fed out through light shielding guide rollers 22 to the next process in a developing device. Winding rollers 16 are rotated by the driving force of motor 19. Disposed on the rear side and front side of winding rollers 16 are sensors 24 and 26 for detecting printing paper 14.

Figure 2:
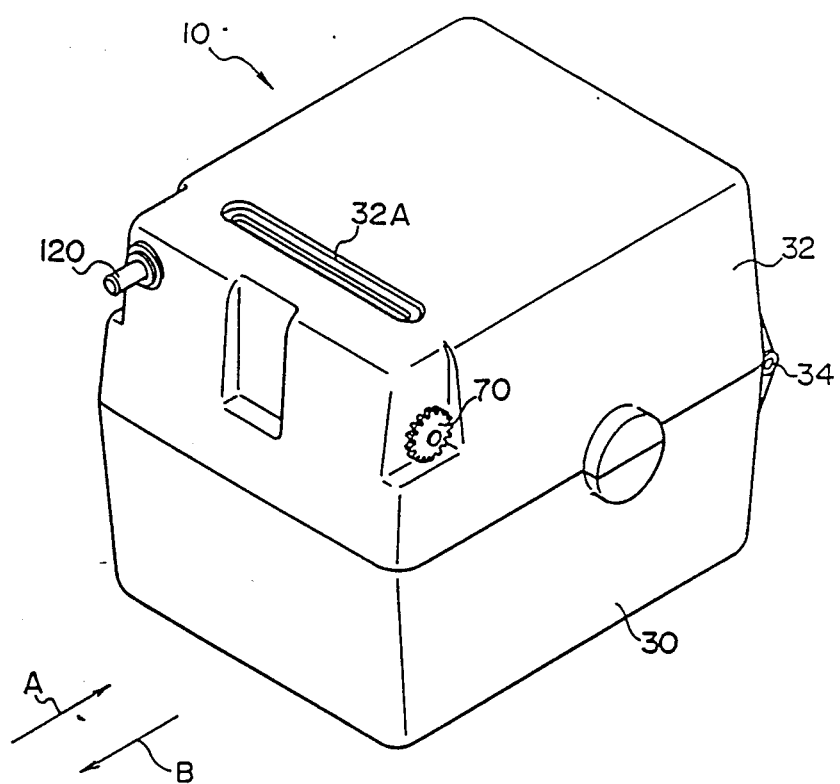
FIG. 2 is a perspective view illustrating the external appearance of a magazine.

As illustrated in FIG. 2, magazine 10 includes a hinge 34 for connecting a lower casing 30 and an upper casing 32 which are combined to constitute the magazine body, thus providing an opening/closing structure. A lock means which is not shown in the drawings is provided to prevent unexpected opening thereof.

Figure 3:
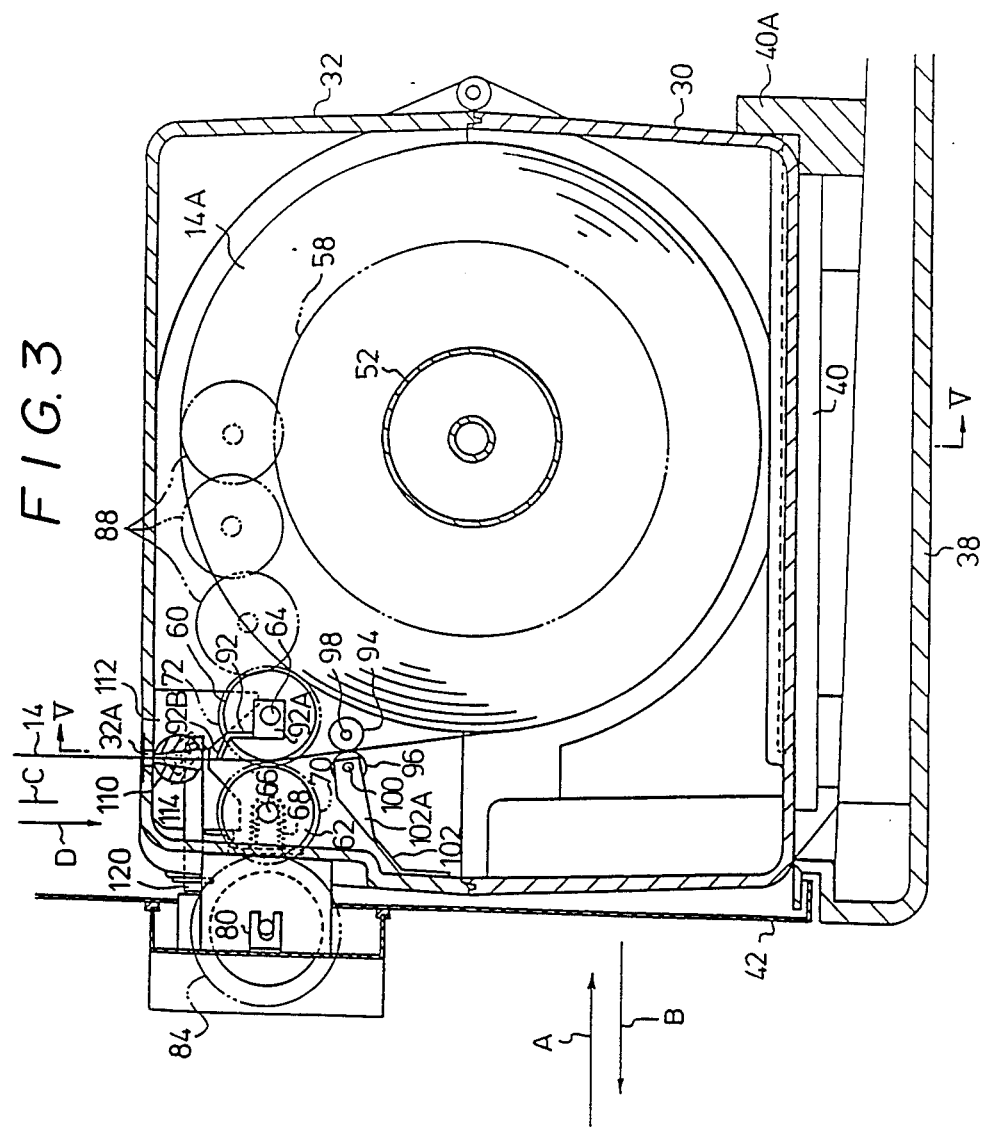
FIG. 3 is a vertical sectional view showing a state where the magazine is loaded.
Figure 5:
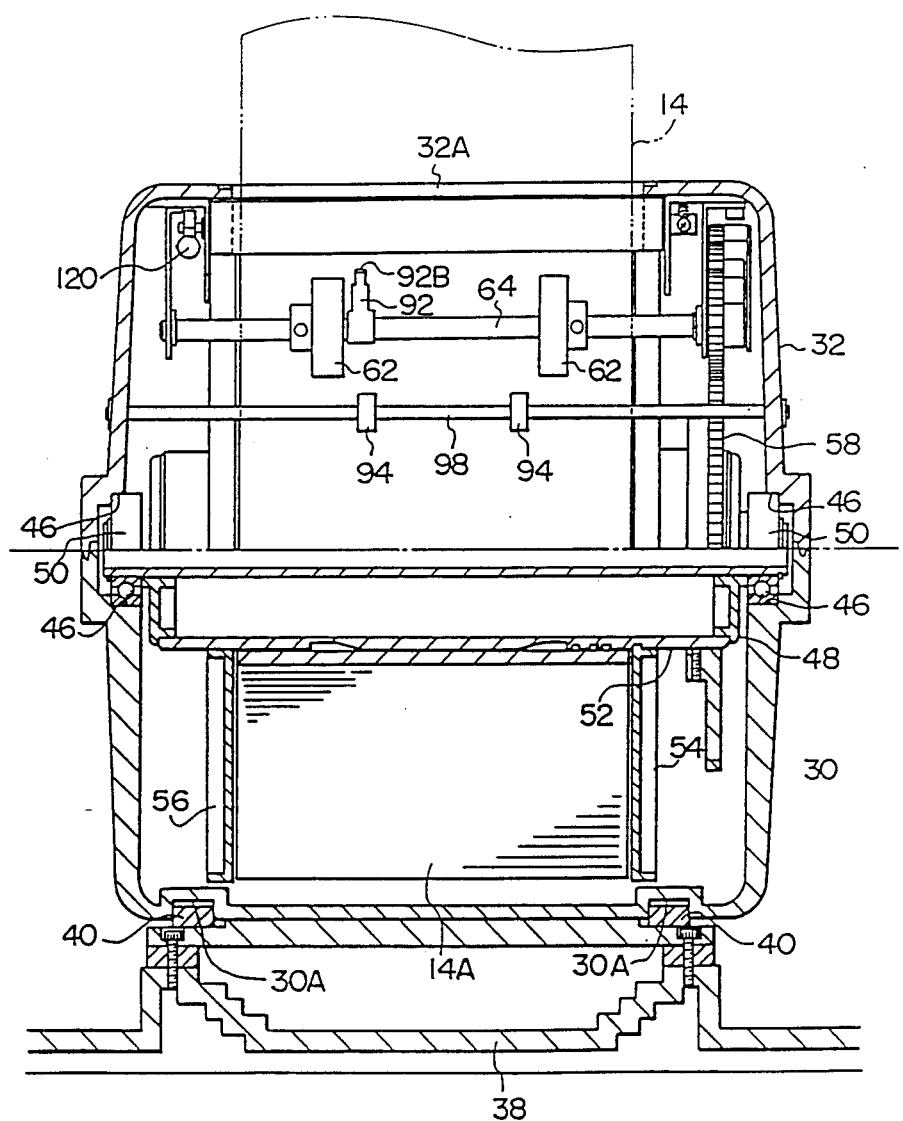
FIG. 5 is a sectional view taken on line V—V of FIG. 3.

A machine frame 38 of printing device 12 is, as depicted in FIGS. 3 and 5, fitted with a pair of guide rails 40 on which magazine 10 is placed. Magazine 10 is inserted and taken out along guide rails 40 in the directions indicated by arrows A and B. In a side surface of lower casing 30 recesses 30A are formed which engage with guide rails 40, whereby magazine 10 is slidable until it impinges upon stoppers 40A formed as protrusions at the ends of guide rails 40.

Magazine 10 is retractable by opening and closing the foregoing cover 42 mounted on machine frame 38. Opening/closing cover 42 is rotated about a rotary shaft 43 (FIG. 4) having its axial center in the up-and-down directions on this side of printing paper of FIG. 1. Printing device 12 can be kept in a light-shielded closing state by a latch means that is not illustrated.

In magazine 10, formed in the impingement portions of upper and lower casings 32 and 30 are axial support recesses 46 for accommodating bearings 50 mounted on both end portions of a rotary support shaft 48. Fixed to the middle of rotary support shaft 48 is a winding drum 52 the outer periphery of which is wound with a rolled portion 14A of printing paper 14. A pair of flanges 54 and 56 for preventing the removal are so fitted in the outer periphery of winding drum 52 as to stand vis-a-vis with each other at both side portions of printing paper rolled portion 14A. A gear 58 that rotates winding drum 52 is fixed to the outer periphery of winding drum 58 so as to be coaxial with flange 56.

A part of upper casing 32 is formed with a slit 32A serving as an outlet for printing paper 14 that is drawn out of rolled portion 14A and forwarded to the exit of printing device 12.

Disposed in the middle area of printing paper 14 leading from rolled portion 14A to slit 32A are a pair of fixed rollers 60 and another pair of pressing rollers 62 for directing the mid-portion of printing paper 14. The pair of fixed rollers 60 are fixed at space W (see FIG. 6) to rotary shaft 64 axially supported on upper casing 32. The pair of pressing rollers 62 are likewise fixed to rotary shaft 66 at space W, the end portions of which are fitted in slots formed in upper casing 32.

Figure 4:
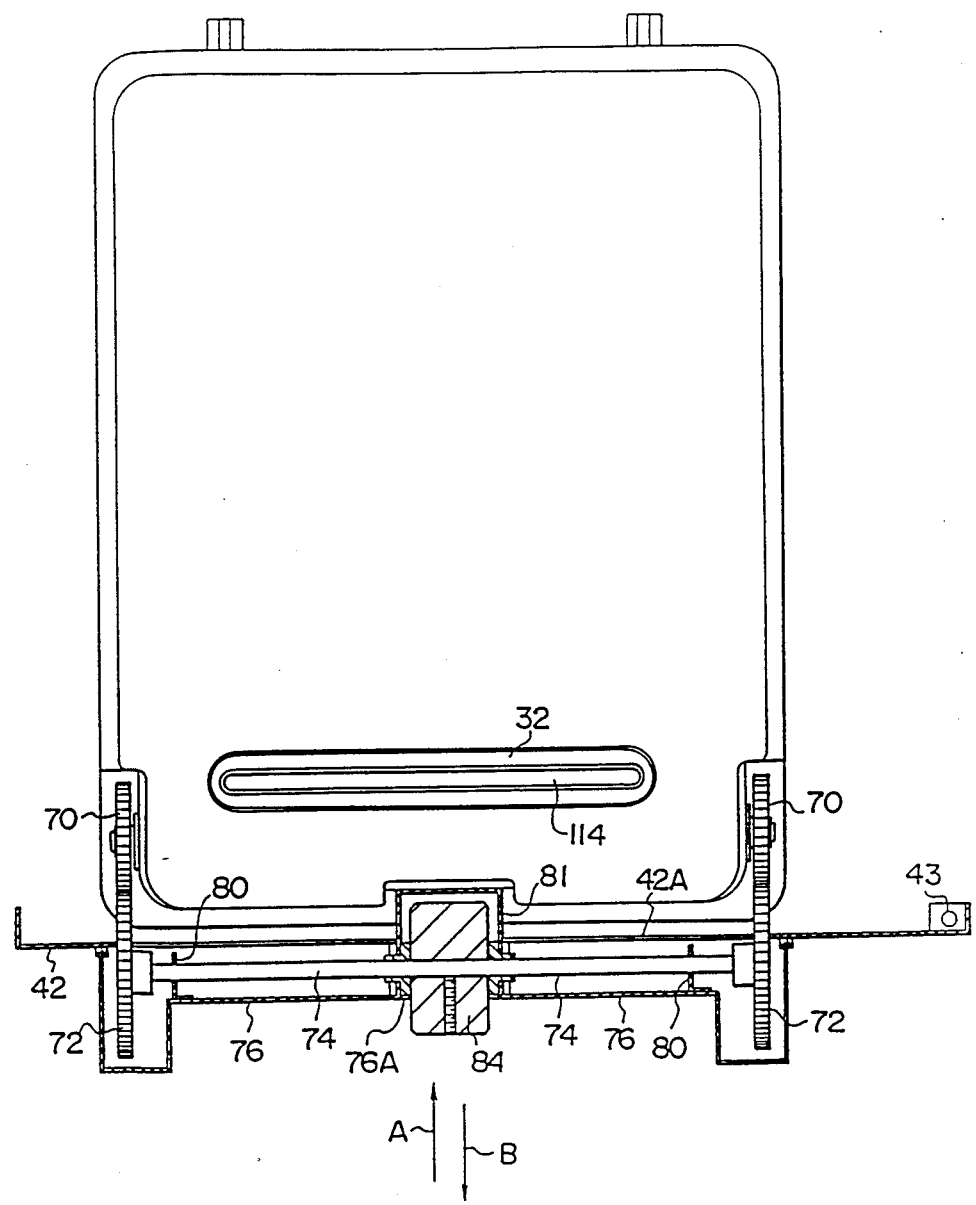
FIG. 4 is a horizontal sectional view taken on line IV—IV of FIG. 1.

A mid-portion of tensile coil spring 68, both ends of which are secured to upper casing 32, is wound in a U-like shape around rotary shaft 66, thereby biasing pressing rollers 62 in such a direction as to separate them from fixed rollers 60. The end portions of rotary shaft 66 in the axial direction pass through slots 67 of the upper casing 32 and jut outside therefrom. Gears 70 are fixed to the protruding end portions of rotary shaft 66. Segmentary portions between rotary shaft 66 and slots 67 are shielded from the light by suttable means. Gears 70, as depicted in FIG. 4, mesh with gears 72, respectively. Gears 72 are, as illustrated in FIG. 4, fixed to both ends of a rotary shaft 74 disposed outwardly of opening/closing cover 42. Gears 72 and rotary shaft 74 are covered with a cover 76 fixed outwardly of opening/closing cover 42. Gears 72 are internally and externally shielded from the light only when opening/closing cover 42 is closed.

Figure 6:
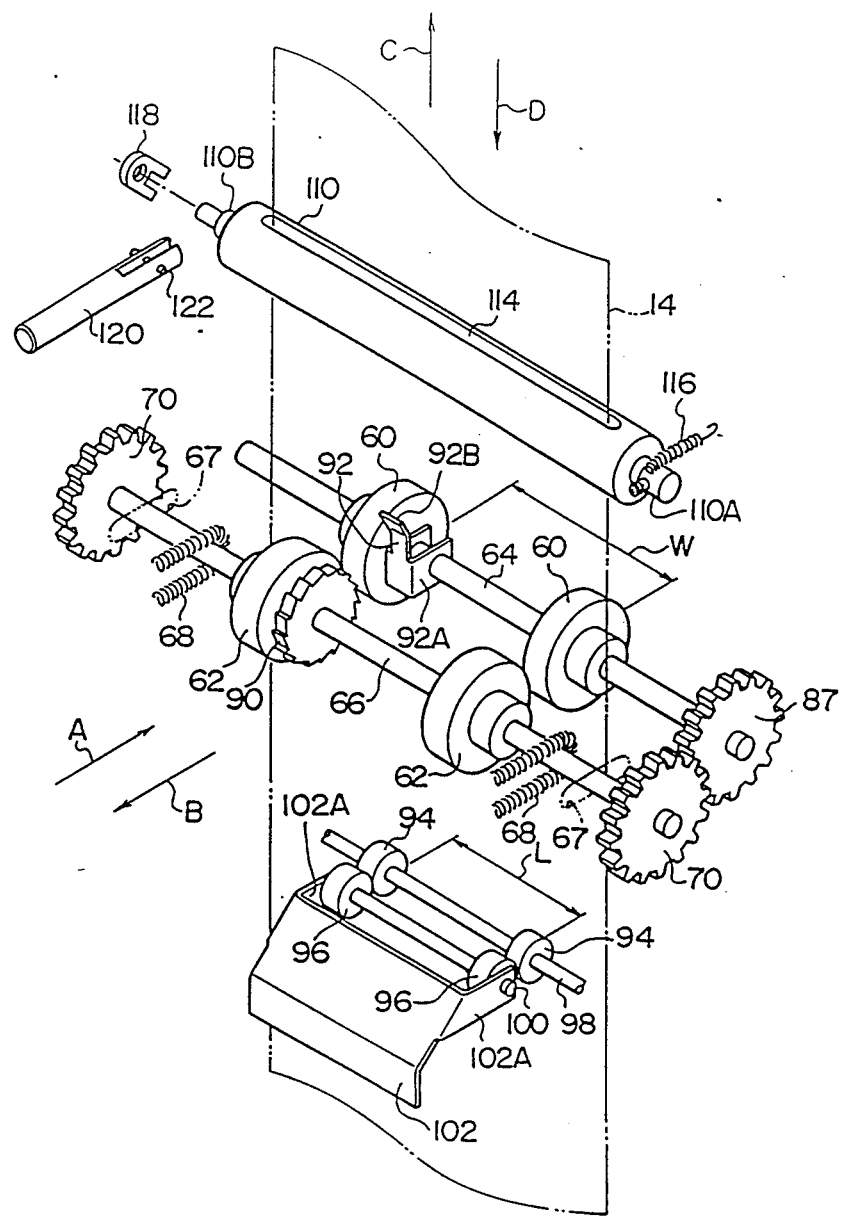
FIG. 6 is an exploded perspective view depicting a portion in the vicinity of a printing paper draw-out unit of the magazine.

Slots 82 and 83 are formed respectively in a support plate 80 fixed to cover 76 and a bracket 81 including its mid-portion bent in a substantially U-like shape, whereby rotary shaft 74 is axially supported and is movable in the directions indicated by arrows A and B of FIG. 1. Fixed to rotary shaft 74 within bracket 81 are large diameter rollers 84 part of which projects outwardly through window 76A formed in cover 76. Based on this construction, an operator rotates large diameter rollers 84 projecting from window 76A while pressing rollers 84 in the direction of arrow A when opening/closing cover 42 is closed. In this state pressing rollers 62 are, as illustrated in FIG. 6, brought into contact with fixed rollers 60. At the same time, there is given a driving force (acting in the direction indicated by an arrow C) for ejecting printing paper 14 from slit 32A while an operator seizes printing paper 14. When the pressing force acting on large diameter rollers 84 is released, however, rotary shaft 66 is separated from fixed rollers 60 by the biasing force of tensile coil spring 68. Hence, the pressing force is not normally imparted to printing paper 14. Even in a state where pressing rollers 62 are separated from fixed rollers 60 by the biasing force of tensile coil spring 68, tooth-depth dimensions of gears 70 and 72 are so determined that gears 72 slightly engage with gears 72.

Figure 7:
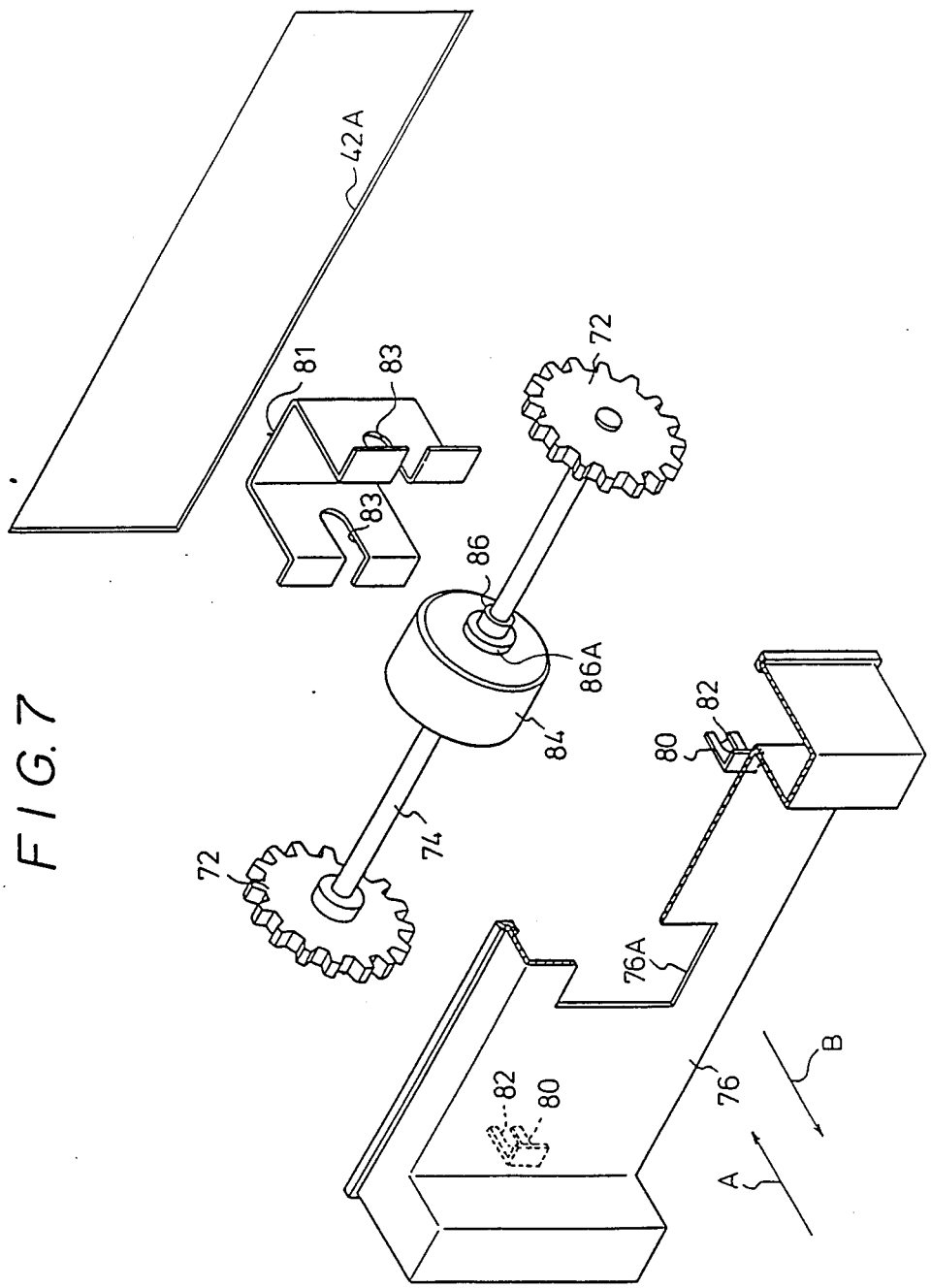
FIG. 7 is an exploded perspective view illustrating a large diameter roller mounted on a light shielding opening/closing cover and also associated parts.
Figure 8:
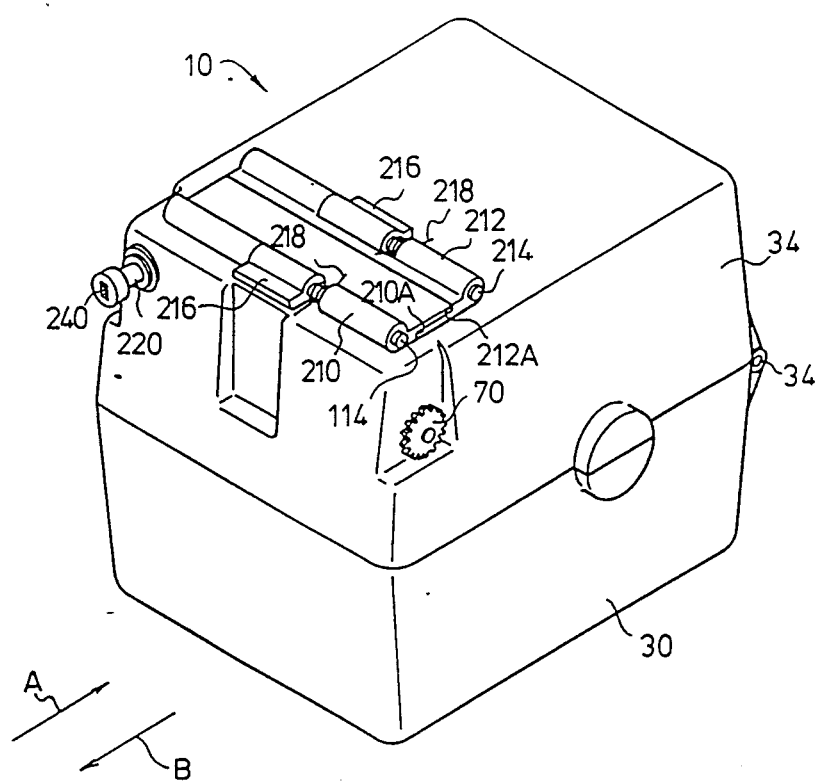
FIG. 8 is a perspective view of the magazine, showing a second embodiment of the present invention.

Note that opening/closing cover 42 is, as depicted in FIGS. 4 and 7, formed with slots 42A for accomodating gears 72, support plate 81 and large diameter roller 84. However, slots 42A are covered with cover 76, thus maintaining the light shielding state. Inserted into slot 83 formed in support plate 81 is a sleeve 86 fitted to rotary shaft 74; and collar 86A of sleeve 86 impinges upon a peripheral edge of slot 83, thereby preventing leakage of light from slot 83. Unillustrated light shielding plates are secured to upper and lower ends of support plate 76 depicted in FIG. 7.

As shown in FIG. 6, a ratchet wheel 90 is so fixed to rotary shaft 66 as to correspond to a stopping pawl 92 axially supported on rotary shaft 64. Stopping pawl 92 includes a substantially U-shaped parallel plate member 92A which may be defined as a support member for rotary shaft 64. The position of gravity of stopping pawl 92 is determined so that, as illustrated in FIG. 3, a tip portion 92B comes in contact with printing paper 14.

Based on this arrangement, when drawing in printing paper 14 (in the direction indicated an arrow D), the end of printing paper 14 is led close to a position between pressing rollers 62 and rotary shaft 64. Printing paper 14 immediately passes by tip portion 92B, and hence tip portion 92B is rotated counterclockwise in FIG. 3 by a self-weight and engages the ratchet wheel 90. As a result, the rotation of pressing rollers 62 in the direction in which to draw in printing paper 14 (clockwise in FIG. 3) is prevented.

Fixed to one end of rotary shaft 64, as illustrated in FIGS. 3 and 6, is gear 87. Gear 87 meshes with gear 58 through a gear train 88 which consists of a plurality of gears (3 gears in this embodiment) that are axially supported on upper casing 32. The rotational force of rotary shaft 64 can be conveyed to rotate winding drum 52. Namely, the operator presses large diameter rollers 84 from the outside of printing device 12 to rotate rollers 84. In this state, fixed rollers 60 undergoes the rotation of pressing rollers 62 as a frictional force. The rotation is conveyed via gear 87 and gear train 88 to winding drum 52. When drawing out the intermediate portion of printing paper 14 from magazine 10 in the direction of arrow C, the winding drum 52 is rotated clockwise as in FIG. 3. Conversely, where printing paper 14 is led into magazine 10, winding drum 52 is rotated counterclockwise so that a large amount of slack or tension is not caused in the middle portion of printing paper 14 that is drawn out of winding drum 52. For this reason, the number of teeth of gear 58 and gear train 88 must be taken into consideration. Note that it is necessary to provide an odd number of gears in gear train 88 thereby causing gears 87 and 58 to rotate in the same direction.

Provided fixed small rollers 94 and moving small rollers 96 correspond to directed the printing paper disposed between fixed rollers 60, pressing rollers 62 and rolled portion 14A. Fixed rollers 94 are secured to a support shaft 98 both ends of which are axially supported on upper casing 32, while moving small rollers 96 are supported on support shaft 100 which in turn is supported by bracket 102. Bracket 102 assumes a L-like configuration with one end fixed to upper casing 32. A pair of parallel leg plates 102A protrude from one end of bracket 102, whereto support shaft 100 is supported. As a plate spring, bracket 102 is adapted to lightly press moving small rollers 96 constantly toward fixed small rollers 94. Therefore, when the end of printing paper 14 is retracted into magazine 10 as large diameter rollers 84 rotate, the middle portion of printing paper 14 continues to be held in place by the biasing force, even if pressing rollers 62 immediately separate from fixed rollers 60 in the case of releasing the pressing force acting on rollers 84, with the result that the force on printing paper 14 is not exerted any more.

Space L between fixed small rollers 94 is narrower than space W between fixed rollers 60 to insure that printing paper 14 is held even when a width of printing paper is small.

A rotary shutter 110 is disposed inwardly of upper casing 32. Rotary shutter 110 assuming, as illustrated in FIG. 6, a cylindrical configuration is encased tightly in block-like shutter casing 112 (FIG. 3) fixed to the inside of upper casing 32. More specifically, shutter casing 112 is formed with a cylindrical accommodation hole for accomodating rotary shutter 110 so that shutter 110 is rotatable about the axial core within shutter casing 112.

Formed in rotary shutter 110 in the radial direction is a through-hole 114 for admitting the passage of printing paper 14. Through-hole 114 assumes, as depicted in FIG. 3, a tapered configuration when viewed from the axial core. If through-hole 114 is aligned in the direction in which printing paper 14 passes, the width thereof is narrow on the side (upper side) of printing unit 18 of printing device 12, while the dimension thereof on the side of rolled portion 14A (carrier up-stream side) is wider. For this reason, the insertion of end of printing paper 14 in the direction of arrow C can be facilitated in a state where rotary shutter 110 is opened.

As is obvious from FIG. 6, a small diameter portion 110A is formed at one axial end of rotary shutter 110. A tensile coil spring 116 is interposed between small diameter portion 110A and upper casing 32, whereby rotary shutter 110 continues to rotate until through-hole 114 deviates from slit 32A.

Fixed to a small diameter portion 110B provided at the other axial end of rotary shutter 110 is one end of an arm 118 whose tip is formed with a slot through which a pin 122 of a slide rod 120 passes. Slide rod 120 is axially supported on upper casing 32 in such a manner as to be slidable in the axial direction. The protruding top end of slide rod 120 corresponds to the inside of opening/closing cover 42. When cover 42 is closed, slide rod 120 works to rotate rotary shutter 110, resisting the biasing force of tensile coil spring 116. Through-hole 114 is aligned with slit 32A, thus forming a port for drawing out printing paper 14.

The function of this embodiment will be described in detail as follows:

When loading rolled portion 14A into magazine 10, upper casing 32 of the magazine is rotated together with lower casing 30 about hinge 34, thereby opening to the inside. At this time, winding drum 52 wound with rolled portion 14A is accomodated together with a bearing 50 in a shaft support recess 46 formed in combination with upper and lower casings 32 and 30, this bearing being fixed to both ends of rotary support shaft 48. Subsequently, upper and lower casings 32 and 30 are fitted to each other and fastened by a lock means that is not illustrated.

In this case, upper casing 32 is disposed in a position that is lower than lower casing 30 by inversing the up-and-down positions thereof from a state depicted in FIG. 2. Lower casing 30 is released from upper casing 32, in which state bearing 50 of winding drum 52 is accomodated in shaft support recess 46 formed in upper casing 32. Then, the top of printing paper 14 that is drawn out of rolled portion 14A on winding drum 52 is inserted between fixed small rollers 94 and moving small rollers 96 and further inserted between fixed rollers 60 and pressing rollers 62. This arrangement facilitates a process for treating the end of printing paper 14 that is pulled out of rolled portion 14A.

Next, magazine 10 in which printing paper 14 is accomodated is, as illustrated in FIGS. 1 and 3, set in printing device 12, and opening/closing cover 42 is closed. Cover 42 then functions to push down the protruded top end of slide rod 120 into magazine 10. As a result, rotary shutter 110 rotates resisting the biasing force of tensile coil spring 116. Subsequently, as illustrated in FIGS. 3 and 6, through-hole 114 in association with slit serves to open the inside of magazine 10, 32A.

At this moment, the operator causes large diameter rollers 84, which jut out from opening/closing cover 42 to rotate into printing device 12 by pushing it. Pressing rollers 62 then approach fixed rollers 60 and seize the top of printing paper 14 positioned therebetween. Printing paper 14 is fed out to printing unit 18 via through-hole 114 and slit 32A. Large diameter rollers 84 are pressed and manually turned a plurality of times. The end of printing paper 14 is thereby transferred to sensor 24 depicted in FIG. 1. At this time, motor 19 is actuated to rotate winding rollers 16. Because of this the end of printing paper 14 is seized by winding rollers 16 in cooperation with pressing rollers 17 and is drawn out to printing unit 18. Upon reaching sensor 26, motor 19 ceases to rotate, thus coming into a standby state.

Thereafter, when effecting a printing process in printing unit 18, the end of printing paper 14 is fed out to printing unit 18 by dint of rotation of winding rollers 16, and a required number of frames are printed. The printed paper is cut by a cutter 28. Note that small fragments cut by cutter 28 are dropped into an accomodation casing 29.

Hence, the end of printing paper 14 comes in close proximity to cutter 28 in prepartion for the next printing process.

In the case of where, after performing a printing process, magazine 10 is replaced with another magazine 10 accommodating a different kind of printing paper 14 or with a magazine 10 into which new printing paper 14 is loaded after consuming all the printing paper stored therein, large diameter rollers 84 protruding from opening/closing cover 42 are again simultaneously pressed and rotated. In this case, the rotational direction is reverse to the direction in which printing paper 14 is loaded. Printing paper 14 whose end is positioned in the vicinity of cutter 28 is thus accommodated in magazine 10.

In this instance, the end of printing paper 14 passes through slit 32A and through-hole 114 and enters magazine 10. In this state, having passed by stopping pawl 92, ratchet 90 is not in contact with printing paper 14, so that stopping pawl 92 rotates by self-weight to engage with ratchet 90, thereby hindering the rotation of pressing roller 62. Consequently, the operator is able to detect a state in which a required amount of printing paper 14 is led into magazine 10 because of the resistance caused in the rotation of large diameter rollers 84. Magazine 10 may now be taken out of printing device 12 by opening the cover 42.

In a state where opening/closing cover 42 is opened, slide rod 120 separates from cover 42. Hence, rotary shutter 110 is rotated by the biasing force of tensile coil spring 116, thus providing a light shielding state in which through-hole 114 is not aligned with slit 32A. No fogging is created on printing paper 14 disposed inside.

When magazine is again loaded into printing device 12 and opening/closing cover 42 is closed, rotary shutter 110 is rotated by slide rod 120, and through-hole 114 is thereby brought into a state in which printing paper 14 can be taken out. When the operator again simultaneously rotates and presses large diameter rollers 84 in a downward direction, fixed rollers 60 and pressing rollers 62 draw out the end of printing paper 14 and feed it via through-hole 114 and slit 32A into printing device 12. Since the end of printing paper 14 is disposed between fixed rollers 60 and pressing roller 62 in the previous step of drawing the printing paper 14 into magazine 10, the printing paper is drawn out by the tensile force which is immediately created when pressing rollers 62 are thrust toward fixed rollers 60. Fixed small rollers 94 and moving small rollers 96 cooperate to hold a portion slightly closer to rolled portion 14A than the end of printing paper 14, thereby securely maintaining a state in which the end thereof is disposed between fixed rollers 60 and pressing rollers 62. Hence, the top of printing paper 14 never unexpectedly comes off between fixed rollers 60 and pressing rollers 62.

In accordance with the embodiment discussed above, the fixed small rollers of small rollers 94 and 96 are interposed between printing paper mid-portion 14 and rolled portion 14A. However, fixed small rollers 94 and moving small rollers 96 are interchangeable in terms of their placement. Stong tension in printing paper 14 is due to the driving force of printing device 12 and the small outside diameter of rolled portion 14A. In such a case, the moving small rollers are moved toward the rolled portion because of the tension. When drawing in the printing paper, however, no tension exists, and hence the moving small rollers again come into contact with the fixed small rollers. Thus, the end of the printing paper can be seized.

A second embodiment is illustrated in FIGS. 8 through 12.

Disposed outwardly on upper casing 32 are shutters 210 and 212 which correspond to slit 32A. Shutters 210 and 212 stand vis-a-vis each other in such a manner that printing paper 14 drawn out from slit 32A is sandwiched therebetween. Shutters 210 and 212 are axially supported by hinge pin 214 and hinge plate 216 so that the shutters can be superposed on upper casing 32. In the state of superposition on the upper casing, slit 32A is closed to shield the inside of magazine 10 from light. Formed at a support member through which shutters 210 and 212 are supported on upper casing 32 and at an opposite end tip portions are stepped portions 210A and 212A which overlap the shutters in such a manner that shutters 210 and 212 are superposed on upper casing 32. The inside of magazine 10 can be shielded from the light by using shutters 210 and 212. Attached to the support member through which shutter 210 and 212 are supported on upper casing 32 is a torsional coil spring 218 wound on hinge pin 214. Torsional coil spring 218 imparts a biasing force that causes shutters 210 and 212 to close slit 32A.

Corresponding to shutters 210 and 212, a shaft 220 which constitutes part of shutter operating means is placed inwardly on upper casing 32. The axial directions of shaft 220 coincide with directions in which magazine 10 is loaded or taken out (directions indicated by arrows A and B). Shaft 220 is supported on upper casing 32 in such a way as to be rotatable and movable in the axial directions. The mid-portion of shaft 220 is integrally fitted with arms 222 and 224 and pin 226 which combine to form, as fully illustrated in FIG. 12, another part of the shutter operating means. Arms 222 and 224 protrude in the same radial direction as shaft 220 and correspond to shutters 210 and 212. The arms penetrate slit 32A by the rotation of shaft 220 and cause shutters 210 and 212 to rotate in directions opposite to each other, resisting the biasing force of torsional coil spring 218, thereby opening slit 32A.

Pin 226 is arranged to project in the radial direction of shaft 220; and its tip engages, inside upper casing 32, with bracket 230 which is fixed to the upper casing 32. Bracket 230 is formed with engagement holes 232 and 234 into which pin 226 is inserted. Engagement hole 232 may be conceived as a slot extending in the directions in which the magazine is loaded and taken out (axial directions of shaft 220). Pin 226 when inserted into engagement hole 232 permits the axial movement of shaft 220 but hinders the rotation of shaft 220. When pin 226 is inserted into engagement hole 232, shaft 220 is disposed in such rotary position that arms 222 and 224 are positioned inwardly of upper casing 32, i.e., the position in which shutters 210 and 212 are placed in the closed position of slit 32A by the biasing force of torsional coil spring 218. Engagement hole 234 may be defined as a slot so formed in continuation from the end of engagement hole 232 in the magazine loading direction (indicated by arrow A) as to be orthogonal to engagement hole 232. Engagement hole 234 is intended to permit the unidirectional rotation of shaft 220 when pin 226 reaches the end of engagement hole 234 in the magazine loading direction (indicated by arrow A). Pin 226 is obliquely inserted in engagement hole 234 as shaft 220 rotates. While on the other hand, pin 236 is inserted into engagement hole 234, an arrangement that permits the rotation of shaft 220 but hinders the axial movement thereof. Shaft 220 is disposed in such a rotary position that arms 222 and 224 pass through slit 32A and project outwardly from upper casing 32 into the inserting position of pin 226 into engagement hole 234, viz., the position in which shutters 210 and 212 are placed in the opening position of slit 32A resisting the biasing force of torsional coil spring 218.

Shaft 220 functions to dispose shutters 210 and 212 in the closed position of slit 32A when pin 226 comes to the end of engagement hole 232 in the magazine take-out direction (indicated by arrow B) at the time of loading the magazine, thus shielding the inside of magazine 10 from the light. After loading the magazine, pin 226 is made to reach the position of engagement hole 234 by manual operation from the outside of opening/closing cover 42, thereby setting shutters 210 and 212 in the open position of slit 32A. In consequence, printing paper 14 can be drawn out of slit 32A.

This operation will hereinafter be discussed in greater detail. Attached to the end of shaft 220 in the magazine loading direction (indicated by arrow A) is a compression coil spring 228 giving a biasing force by which pin 226 is held at the end of engagement hole 232 in the magazine take-out direction (indicated by arrow B). When loading the magazine, shutters 210 and 212 are disposed in the closed position of slit 32A.

The end portion of shaft 220 in the magazine take-out direction (indicated by arrow B) passes through upper casing 32 and protrudes from the inside of upper casing 32 to the outside thereof. The tip portion of shaft 220 is formed with a rectangular hole 240. Corresponding to this rectangular hole 240, a rotary handle 242 is mounted on opening/closing cover 42. When closing cover 42, part of handle 242 is inserted into rectangular hole 240 and engaged therewith. At the same moment shaft 220 is thrust down by handle 242, with the result that shaft 220 is forced into the magazine loading direction (indicated by arrow A) resisting the biasing force of compression coil spring 228. Upon an intrusion of shaft 220, pin 226 is positioned at the end of engagement hole 232 in the magazine loading direction (indicated by arrow A) when opening/closing cover 42 is fully closed. Subsequently, shaft 220 is rotated by turning handle 242. With the rotation of shaft 220, pin 226 is positioned in engagement hole 234, thereby moving shutters 210 and 212 to the opening position of slit 32A. The degree of rotation of handle 242 is restricted by an adaptive means that is not illustrated. On the other hand, as handle 242 is rotated, shutters 210 and 212 cooperate to assume a tapered configuration depicted in FIG. 9, and the spacing between both the shutters 210 and 212 becomes narrower along the tip end portions thereof in the open position of slit 32A. In this configuration, printing paper 14 can be drawn out of slit 32A and led over a relatively long range in the draw-out direction.

Description of function of second embodiment is as follows:

pin 226 is positioned at the end of engagement hole 232 in the magazine take-out direction (indicated by arrow B) by the biasing force of compression coil spring 228. For this reason, shutters 210 and 212 are held in the closed position of slit 32A while being biased by torsional coil spring 218, whereby the inside of magazine 10 is shielded from the light.

In the wake of this step, magazine 10, which stores printing paper 14, is loaded into printing device 12, and opening/closing cover 42 is closed.

When cover 42 is closed, handle 242 is partially inserted into rectangular hole 240 formed in shaft 220 and is then engaged therewith. Simultaneously, upon thrusting handle 242, shaft 220 intrudes in the magazine loading direction (indicated by arrow A) resisting the biasing force of compression coil spring 228. In the fully-closed position of cover 42, pin 226 is disposed at the end of engagement hole 232 in the magazine loading direction, in which state shaft 220 can never be unexpectedly rotated, because pin 226 is held at the end of engagement hole 232 in the magazine loading direction (indicated by arrow A) by the biasing force of compression coil spring 228.

Consequently, there is no possibility of shaft 220 suddenly rotating when opening/closing cover 42 is closed or in the closing state; nor is it possible for pin 226 to be positioned in engagement hole 234. Also in this instance, shutters 210 and 212 of slit 32A are held in the closed position by the biasing force of torsional coil spring 218, thereby shielding the inside of magazine 10 from the light with certainty.

Figure 9:
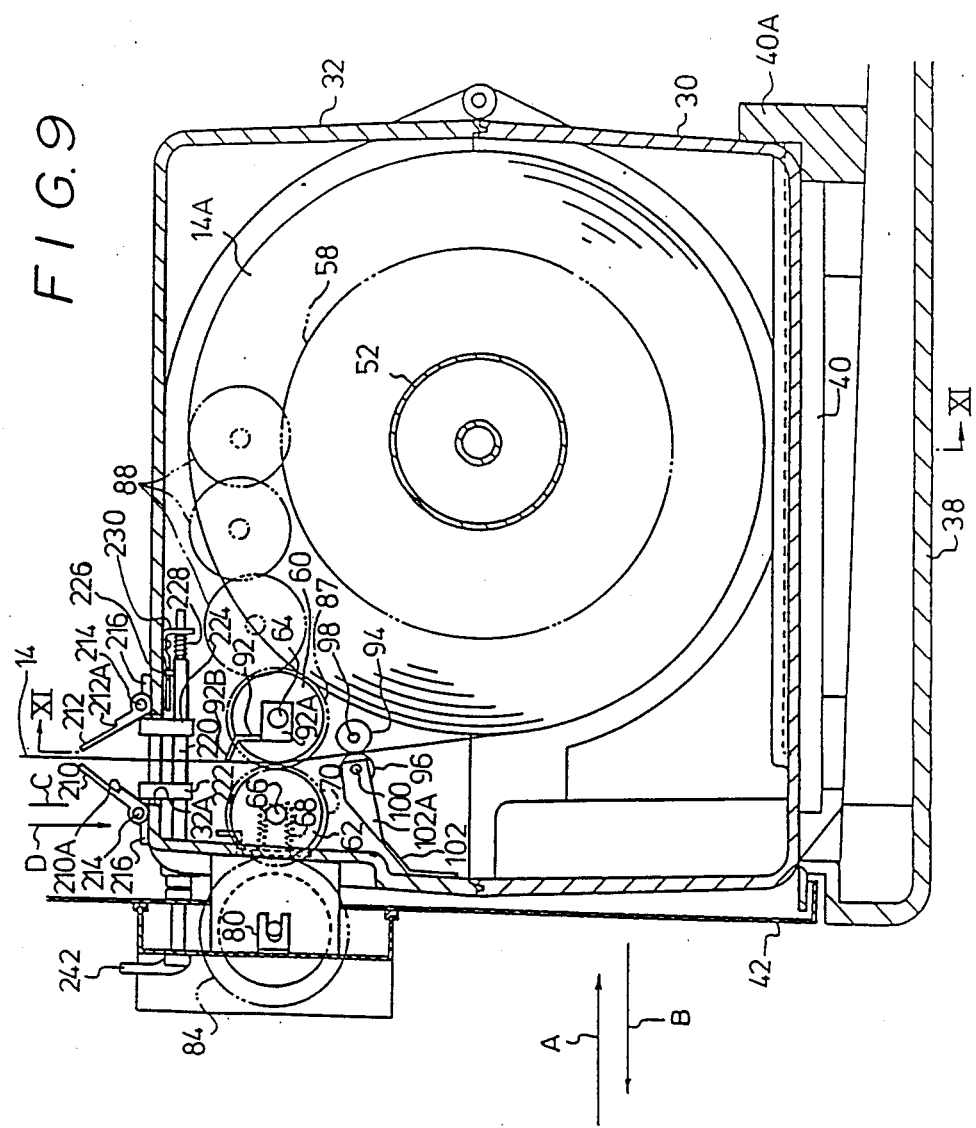
FIG. 9 is a vertical sectional view depicting a state where the magazine is loaded.
Figure 10:
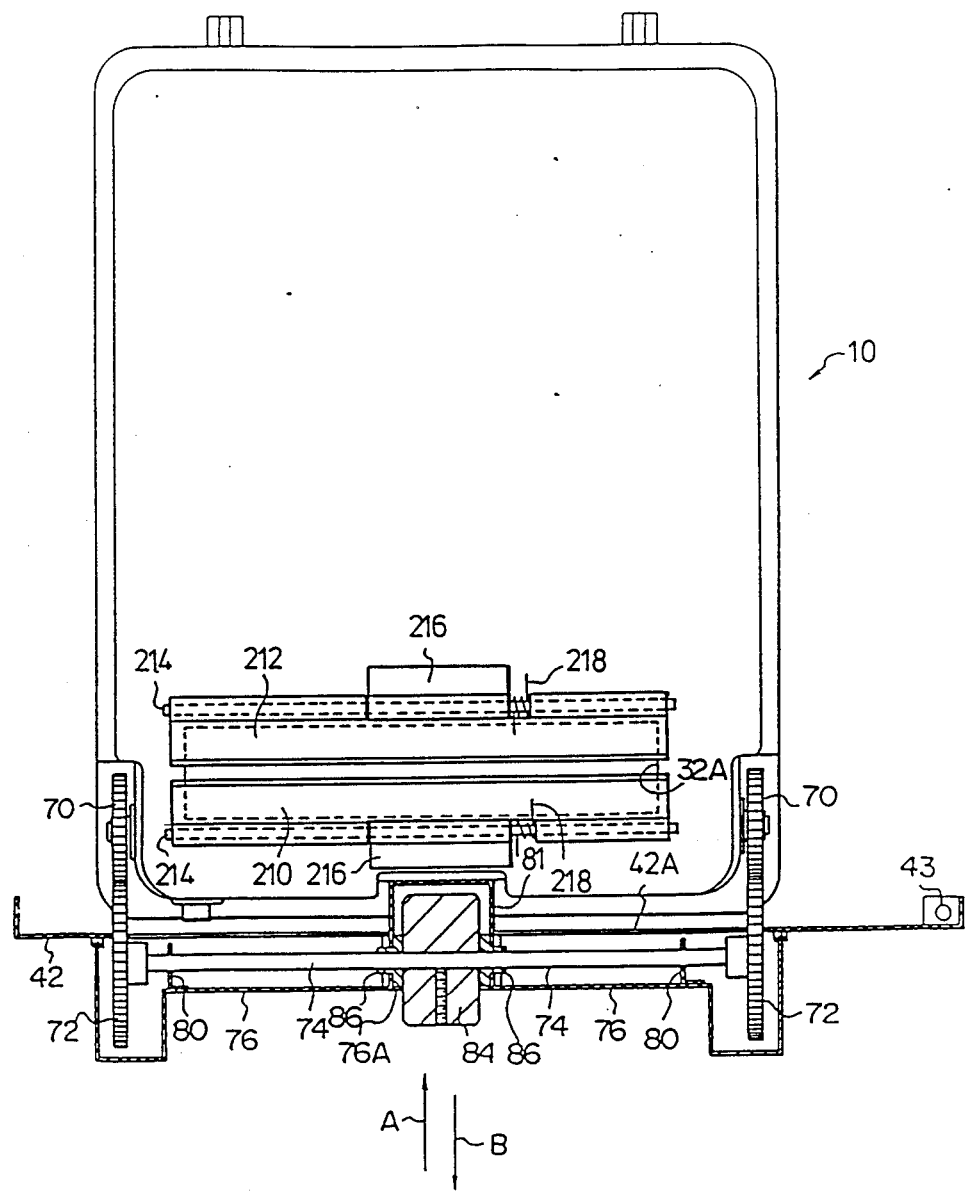
FIG. 10 is a horizontal sectional view similar to FIG. 4.
Figure 11:
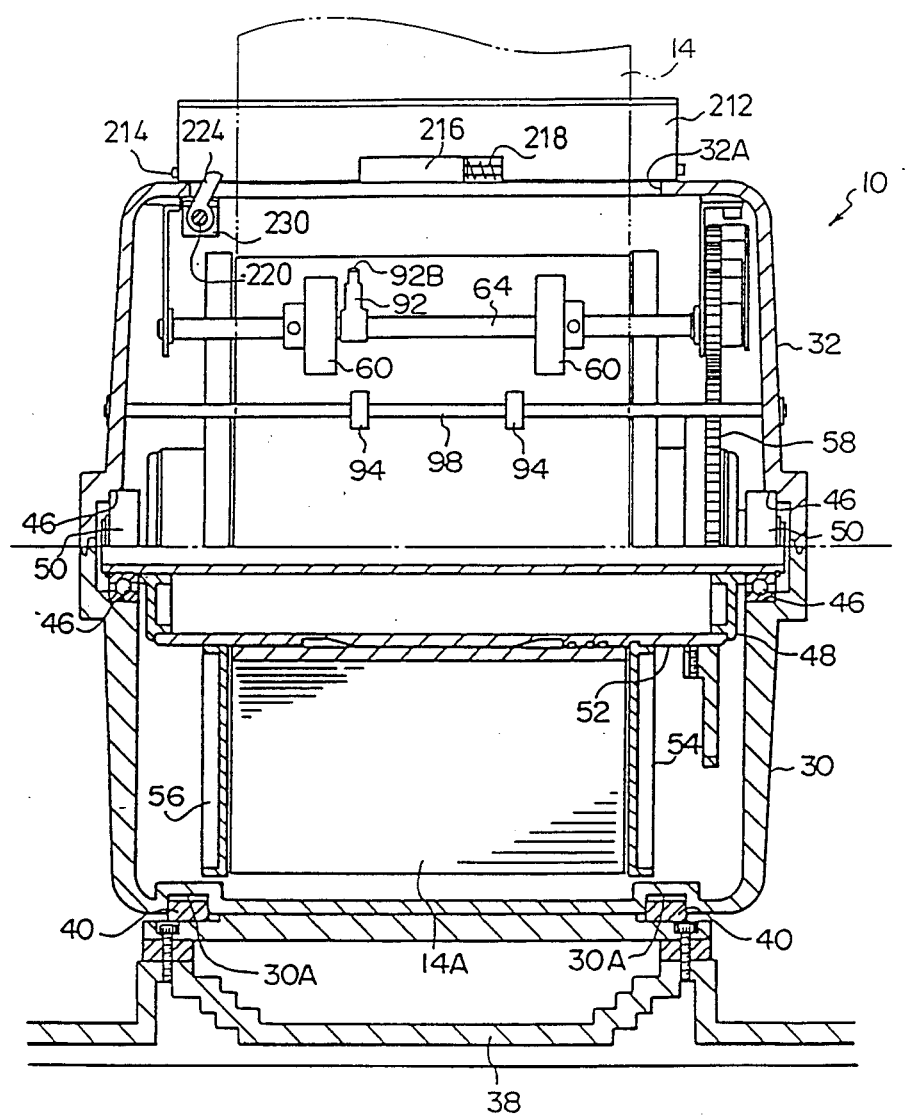
FIG. 11 is a sectional view taken on line XI—XI of FIG. 9.
Figure 12:
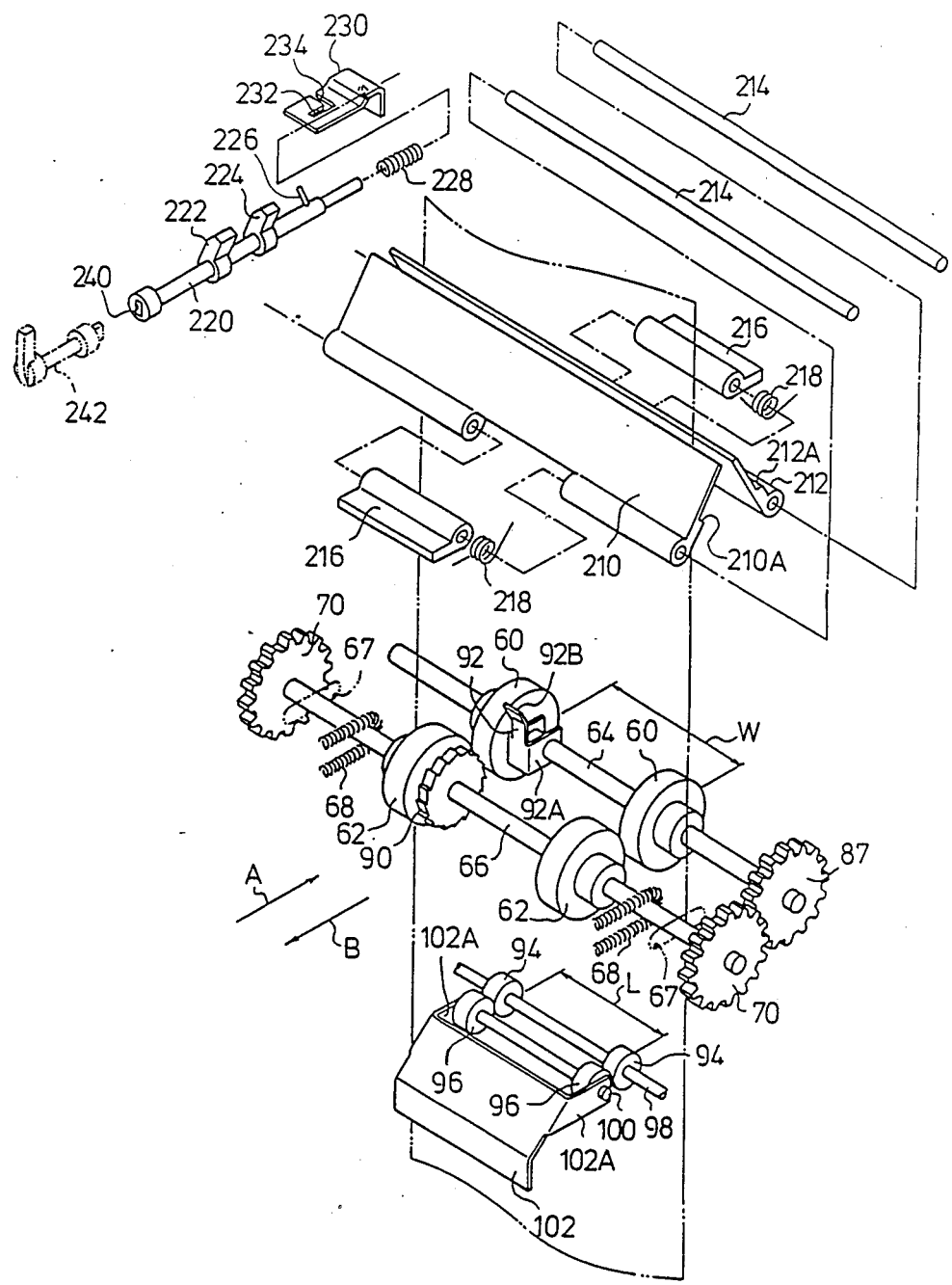
FIG. 12 is an exploded perspective view depicting a portion close to the printing paper draw-out unit of the magazine in the second embodiment.

After closing cover 42, shaft 220 is rotated by turning handle 242 from the outside of opening/closing cover 2. With the rotation of shaft 220, pin 226 is positioned in engagement hole 234, while shutters 210 and 212 are disposed in the open position of slit 32A, assuming a configuration where the spacing therebetween becomes, as depicted in FIG. 9, narrower as their tips approach. Shutters 210 and 212 serve to open slit 32A for drawing out printing paper 14. At the time of being drawn out of slit 32A, printing paper 14 is guided by shutters 210 and 212.

As in the embodiment discussed above, the operator operates large diameter rollers 84 projecting outwardly of opening/closing cover 42 in order to feed printing paper 14 into printing device 12, where the printing process is to be effected.

When magazine 10 is replaced with a new magazine, printing paper 14 is, as in the case of the previous embodiment, led into magazine 10 by operating large diameter rollers 84.

Thereafter, shaft 220 is rotated by turning handle 242 from the outside of opening/closing cover 42. In this instance, the rotational direction of shaft 220 is reverse of the direction when loading magazine 10. With this arrangement, pin 226 is positioned at the end of engagement hole 232 in the magazine loading direction (indicated by arrow A), while shutters 210 and 212 are placed in the closing position of slit 32A by the biasing force of torsional coil spring 218. Thus magazine 10 can be internally shielded from the light.

Hence, when closing the cover, magazine 10 is brought into the light shielding state. Subsequently, cover 42 is opened, and magazine 10 may be taken out.

In connection with the operation of magazine 10, since opening/closing cover 42 separates from the end of shaft 220 in the magazine take-out direction (indicated by arrow B) when cover 42 is open, shutters 210 and 212 are held in the closing position of slit 32A by the biasing force of torsional coil spring 218. In addition, pin 226 is positioned in the end of engagement hole 232 in the magazine take-out direction by the biasing force of compression coil spring 228, thereby hindering the rotation of shaft 220. For this reason, there is no possibility of shutters 210 and 212 unexpectedly operating when taking out magazine 10, and opening slit 32A. Thus, the complete internal light shielding of magazine 10 can be attained.

It is to be noted that if shutters 210 and 212 of slit 32A are disposed in the closed position by turning handle 242 when releasing the latch of opening/closing cover 42 while interlocking handle 242 with the latch means of cover 42, printing paper 14 stored in magazine 10 is shielded from the light even when cover 42 is mistakenly opened.

Shutters 210 and 212 may be operated by manipulating a switch of a motor from the outside of cover 42 while driving shaft 220 by the motor.

Although illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A feeder, incorporated into a photosensitive material processor of a printing device, for feeding a photosensitive material to the printing device, said feeder comprising:
(a) a magazine body accommodating said photosensitive material therein and being formed with a take-out port for feeding out said photosensitive material;
(b) a pair of rollers, provided in said magazine body, for imparting a driving force while sezing a mid-portion of said photosensitive material;
(c) biasing means for separating one roller of said pair of rollers from the other roller of said pair of rollers; and
(d) driving force conveying means, partially exposed to the outside of said magazine body, for selectively displacing said one roller close to said other roller by applying pressing and rotational forces from outside of said magazine body to said pair of rollers, and for feeding out said photosensitive material from said take-out port by moving said photosensitive material while seizing said material, whereby said photosensitive material is totally stored in said magazine body before loading said magazine into said photosensitive material processor, thus preventing exposure of said photosensitive material to light to thus avoid the generation of unnecessary fogging in said photosensitive material.

2. The feeder as set forth in claim 1, wherein said driving force conveying means includes input rollers, whose outer periphery is partially exposed to the outside of said magazine body, used for imparting the pressing and rotational forces of an operator.

3. The feeder as set forth in claim 2, wherein said one roller and said other roller each comprise a shaft, and said shaft of said one roller is arranged to move toward said shaft of said other roller by said operator imparting a pressing force, and one of said rollers is placed close to the other by the movement of said shaft.

4. The feeder as set forth in claim 3, wherein said one roller and said other roller each further comprise a gear, wherein said gear fixed to said one roller meshes with said gear fixed to said other roller, thereby conveying an input rotational force to one of said rollers.

5. The feeder as set forth in claim 4, wherein said shaft of one of said rollers penetrates said magazine body, and said gear is fixed to the tip of said shaft passing therethrough.

6. The feeder as set forth in claim 5, wherein said shaft is provided with a hindering means for hindering the rotation in a draw-in direction of said photosensitive material in a state where the end of said photosensitive material is led into said magazine body.

7. The feeder as set forth in claim 6, wherein said hindering means includes a ratchet wheel fixed to said shaft and a stopping pawl for hindering the rotation of said shaft by engaging with said ratchet wheel.

8. The feeder as set forth in claim 7, wherein said stopping pawl is axially supported on said other shaft, and the tip of said stopping pawl is biased toward said photosensitive material held between the pair of rollers, thereby engaging with said ratchet wheel during times when said stopping pawl does not contact said photosensitive material.

9. The feeder as set forth in claim 1, wherein said driving force conveying means conveys the rotational force to a rolled portion of said photosensitive material, and biases said rolled portion in the winding direction when retracting said photosensitive material.

10. The feeder as set forth in claim 9, wherein the driving force is conveyed via a roller shaft of one roller of said pair of rollers to said rolled portion of said photosensitive material.

11. The feeder as set forth in claim 1, wherein interposed between said pair of rollers and a rolled portion of said photosensitive material is seizing means for seizing said mid-portion of said photosensitive material by a biasing force in such a state that when the top of said material is drawn into said magazine body said seizing means being for holding the top of said material in a seizable position with said pair of rollers for a next feed-out operation.

12. The feeder as set forth in claim 11, wherein said seizing means includes a pair of rollers, and when said photosensitive material increases in tension, said one roller undergoing no large amount of tension is pressed against said another roller undergoing a large amount of tension by the biasing force.

13. The feeder as set forth in claim 1, wherein said take-out port is provided with shutters each opened by a driving force imparted from the outside of said magazine body, said shutters functioning to shield light from entering a cavity defined by said magazine body through said take-out port while in a closed state.

14. The feeder as set forth in claim 13, further comprising interlocking means for closing said shutters by opening a light shielding cover of said photosensitive material processor.

15. The feeder as set forth in claim 14, further comprising biasing means for biasing said shutters in such a direction as to close said take-out port, said shutters being opened by the force for closing said light shielding 16. The feeder as set forth in claim 13, further comprising connecting means connected by closing said light shielding cover and being interposed in mechanical connection with said shutters, and operating means mounted on said light shielding cover of said photosensitive material processor for operating said shutters.

17. A feeder, incorporated into a photosensitive material processor of a photo-printing device, for feeding a photosensitive material to this processor, said feeder comprising:
(a) a magazine body accommodating a rolled photosensitive material therein and being formed with a take-out port for drawing out the end of said photosensitive material led from said rolled photosensitive material;
(b) shutters, provided at said take-out port, for shielding the inside of said magazine body at the time of closing, and for permitting passage of said photosensitive material at the time of opening, and
(c) interlocking means, interposed between a light shielding cover of said processor and said shutters, for opening said shutters by a driving force, whereby said magazine storing all said photosensitive material, is loaded into said processor or dismounted therefrom while totally containing and shielding said photosensitive material from light, thus eliminating unnecessary fogging caused on said photosensitive material.

18. The feeder as set forth in claim 17, further comprising biasing means for biasing said shutters in the closing direction of said take-out port, wherein a force for closing said light shielding cover is conveyed and utilized as a force for opening said shutters.

19. The feeder as set forth in claim 18, wherein said light shielding cover includes means, connected to said shutters by closing said light shielding cover, for inputting an operating force by an operator.

20. A feeder, incorporated into a photosensitive material processor of a printing device, for feeding a photosensitive material to said printing device, said feeder comprising:
(a) a magazine accommodating said photosensitive material therein and being formed with a take-out port for feeding out said photosensitive material;
(b) a pair of rollers, provided in said magazine body, for imparting a driving force while seizing a mid-portion of said photosensitive material;
(c) biasing means for separating one roller of said pair of rollers from the other roller of said pair of rollers;
(d) photosensitive material mid-portion seizing means, disposed between said rollers and a photosensitive material rolled portion, for holding said photosensitive material in a position suitable for a next feedout between said rollers even after releasing a photosensitive material seizing force of said rollers; and
(e) driving force conveying means, partially exposed to the outside of said magazine body, for selectively displacing said one roller close to said other roller by applying pressing and rotational forces from the outside of said magazine body to said rollers and for feeding out said photosensitive material from said take-out port by moving said photosensitive material while seizing said material, whereby said photosensitive material is totally accommodated in said magazine body before loading said magazine into said photosensitive material processor, thus preventing exposure of said photosensitive material to light to thus avoid generation of unnecessary fogging of said photosensitive material.

21. The feeder as set forth in claim 20, wherein said seizing means includes a pair of rollers, and when said photosensitive material increases in tension, said one roller undergoing no large amount of tension is pressed against said another roller undergoing the large amount of tension by a biasing force.

22. The feeder as set forth in claim 20, wherein said one roller comprises a roller shaft which is provided with hindering means for hindering the rotation in a draw-in direction of said photosensitive material in a state where the top of said material is pulled into said magazine body.

23. The feeder as set forth in claim 22, wherein said hindering means includes a ratchet wheel fixed to said roller shaft of said one roller, and a stopping pawl for hindering the rotation of said roller shaft by engaging with said ratchet wheel.

24. The feeder as set forth in claim 23, wherein said other roller comprises a roller shaft having said stopping pawl axially supported thereon, and the tip of said stopping pawl is biased along a movement trajectory of said photosensitive material, thereby engaging with said ratchet wheel during times when said stopping pawl does not contact said photosensitive material.

* * * * *